US012421089B1

(12) United States Patent
Vaclavik, Jr.

(10) Patent No.: US 12,421,089 B1
(45) Date of Patent: Sep. 23, 2025

(54) ADJUSTABLE FORK BRACKET

(71) Applicant: Joe Vaclavik, Jr., West Fairfield, TX (US)

(72) Inventor: Joe Vaclavik, Jr., West Fairfield, TX (US)

( * ) Notice: Subject to any disclaimer, the term of this patent is extended or adjusted under 35 U.S.C. 154(b) by 325 days.

(21) Appl. No.: 18/126,823

(22) Filed: Mar. 27, 2023

(51) Int. Cl.
*E02F 3/96* (2006.01)
*B66F 9/12* (2006.01)

(52) U.S. Cl.
CPC ................ *B66F 9/12* (2013.01); *E02F 3/962* (2013.01)

(58) Field of Classification Search
None
See application file for complete search history.

(56) References Cited

U.S. PATENT DOCUMENTS 3,667,633 A 6/1972 Cappella
3,795,331 A * 3/1974 Guest ...................... E02F 3/401 414/724
4,242,035 A 12/1980 Hornstein
5,315,772 A * 5/1994 Lalonde ............. A01D 87/0069 37/379
6,022,184 A 2/2000 Friedland
7,673,403 B2 * 3/2010 Bridges ................... E02F 3/962 37/446
8,128,334 B2 * 3/2012 Arensdorf ................. B62B 3/02 414/458
2003/0228210 A1 12/2003 Friedland et al.
2006/0182600 A1 8/2006 Deyo et al.
2012/0312633 A1 * 12/2012 Massey ............... E04G 21/3276 182/3
2014/0248111 A1 9/2014 Williams et al.
2014/0317968 A1 10/2014 Payne
2016/0207506 A1 * 7/2016 Slager ....................... B60T 3/00
2022/0064899 A1 3/2022 Reid

FOREIGN PATENT DOCUMENTS

CA 2440808 A1 3/2005
GB 2460821 A 12/2009

* cited by examiner

*Primary Examiner* — Michael S Lowe
(74) *Attorney, Agent, or Firm* — Cramer Patent & Design, PLLC.; Aaron R. Cramer

(57) ABSTRACT

The adjustable fork bracket may comprise a left fork bracket, a right fork bracket, a left rachet strap, and a right ratchet strap. The adjustable fork bracket may be an accessory for coupling a fork to a front edge of a bucket of construction equipment. Tines of the fork may enable the construction equipment to lift materials using the bucket. The left fork bracket may comprise a left primary tine on the left side of the bucket and the right fork bracket may comprise a right primary tine on the right side of the bucket. The left rachet strap and the right ratchet strap may pass behind the bucket to retain the adjustable fork bracket in place. A primary tine separation distance between the left primary tine and the right primary tine may be adjustable.

16 Claims, 5 Drawing Sheets

ADJUSTABLE FORK BRACKET

RELATED APPLICATIONS

None.

FIELD OF THE INVENTION

The present invention relates generally to a fork bracket for a tractor or forklift and more specifically to an adjustable fork bracket for a tractor or forklift.

BACKGROUND OF THE INVENTION

Forklifts are essential tools in material handling and are used in a wide range of industries, including warehousing, manufacturing, construction, and logistics. They are designed to lift and transport heavy loads, making them a vital part of any material handling process. This is because forklifts can handle large and heavy loads with ease, allowing for faster and more efficient material handling processes, are often designed with safety features such as stability control, load capacity indicators, and operator training programs. These features help to reduce the risk of accidents and injuries in the workplace and are traditionally available in a variety of sizes and configurations, allowing them to be used in different environments and for different applications.

However, one drawback to a traditional forklift is that fork brackets lack adjustability and must be changed out using cumbersome tools. The development of the adjustable fork bracket fulfills this need in a manner that is both safe and efficient and avoids the need for the use of tools commonly associated with installing or changing a traditional fork bracket onto a tractor or forklift.

SUMMARY OF THE INVENTION

To achieve the above and other objectives, the present invention provides for adjustable fork bracket that can be attached to a bucket of construction equipment to lift materials using forks. It comprises a left fork bracket with a left primary tine, a right fork bracket with a right primary tine and a separation lockdown, a left ratchet strap, and a right ratchet strap to prevent tipping. The left lateral arm can be oriented laterally across the front of the bucket, and it is an L-shaped armature with a vertically oriented leg located at the front and a horizontally oriented leg located at the top. The vertically oriented leg couples to the horizontally oriented leg at a top front of the left lateral arm.

The left primary tine may be coupled to the bottom left side of the vertically oriented leg of the left lateral arm. The right fork bracket may include a right channel between the horizontally oriented leg of the right lateral arm and the right primary tine. The left fork bracket may include the left primary tine on the left side of the bucket and the right fork bracket includes the right primary tine on the right side of the bucket. The rear of the left primary tine may include a left strap coupler for coupling the left ratchet strap to the rear of the left primary tine. The left strap coupler may be a left hook aperture. The forward end of the left primary tine may have a tapered left tine tip to guide the left primary tine.

The right lateral arm may be an L-shaped armature with a right tine tip on the forward end of the right primary tine. The right tine tip may be tapered to guide the right primary tine. The separation lockdown may be located on the top left of the right lateral arm and engages a slot on the separation adjuster to prevent movement of the separation adjuster. The separation lockdown may include a variety of hardware, such as bolts, nuts, threaded apertures, flat washers, lock washers, or any combination thereof that is tightened against the separation adjuster to prevent movement of the separation adjuster. The strap may be coupled at one end to the top hook and at the opposite end to the bottom hook, and the top hook is attached to the top rear of the bucket. The strap of the right and left ratchet strap may be a nylon cargo strap.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
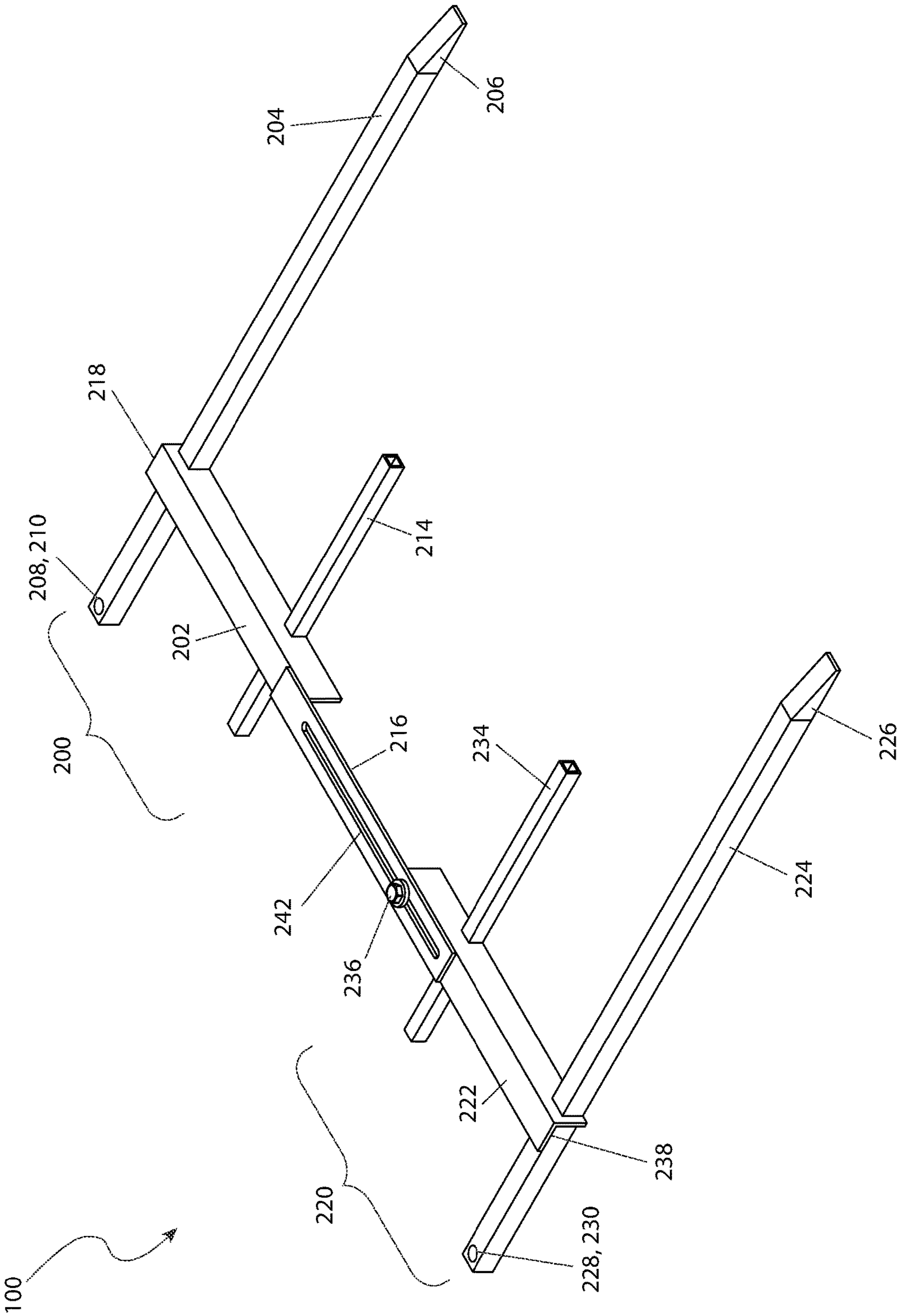
FIG. 1 is an isometric view of an adjustable fork bracket, according to an embodiment of the present invention.
Figure 2:
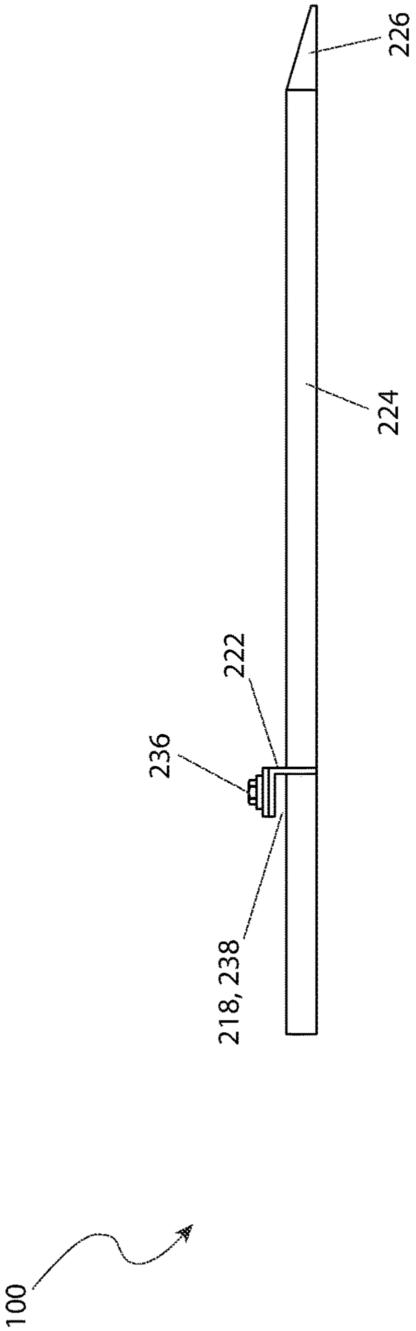
FIG. 2 is a side view of an adjustable fork bracket, according to an embodiment of the present invention.
Figure 3:
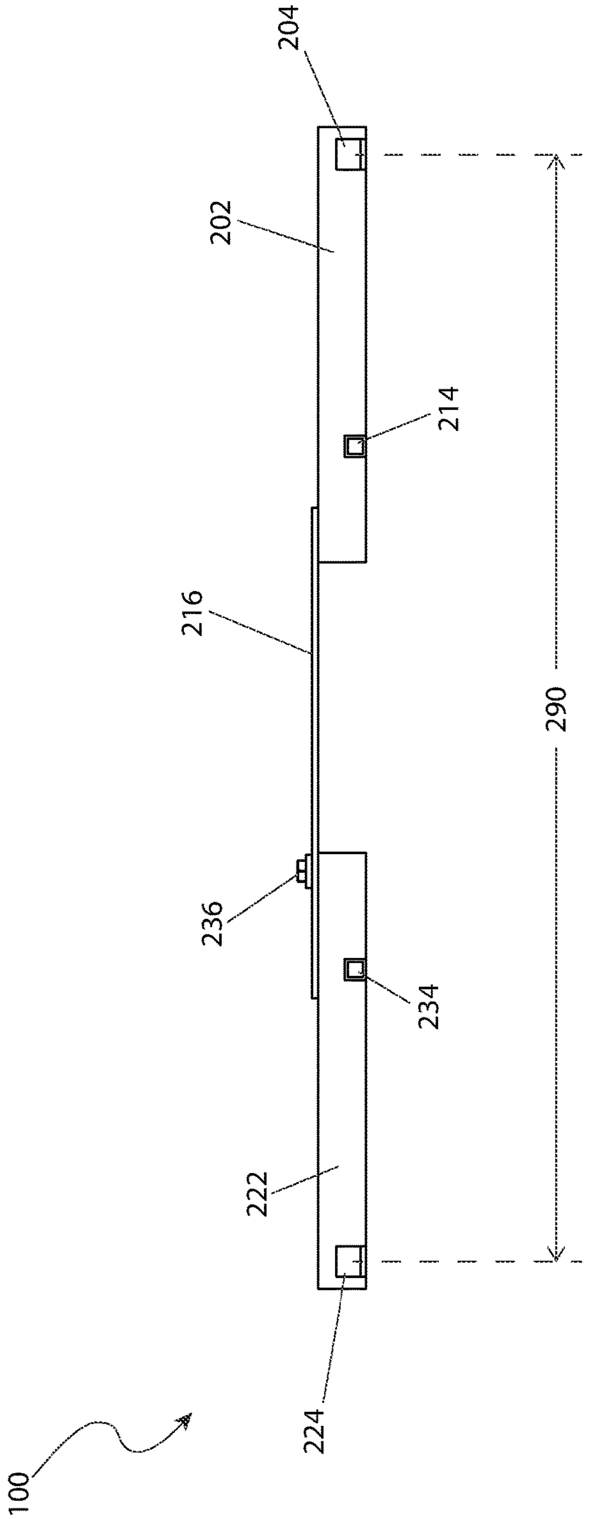
FIG. 3 is a front view of an adjustable fork bracket, according to an embodiment of the present invention.
Figure 4:
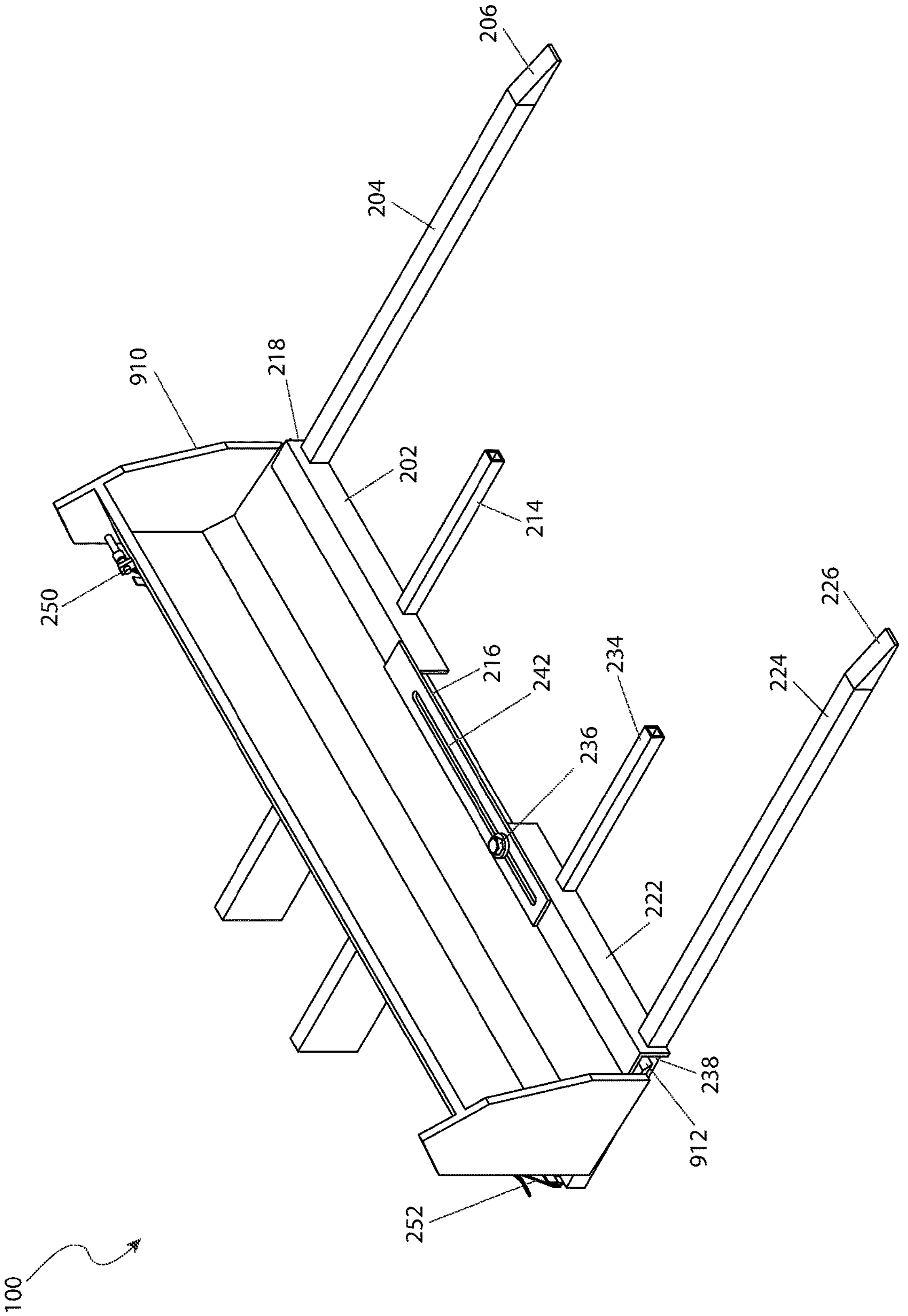
FIG. 4 is an in-use view of an adjustable fork bracket, according to an embodiment of the present invention.
Figure 5:
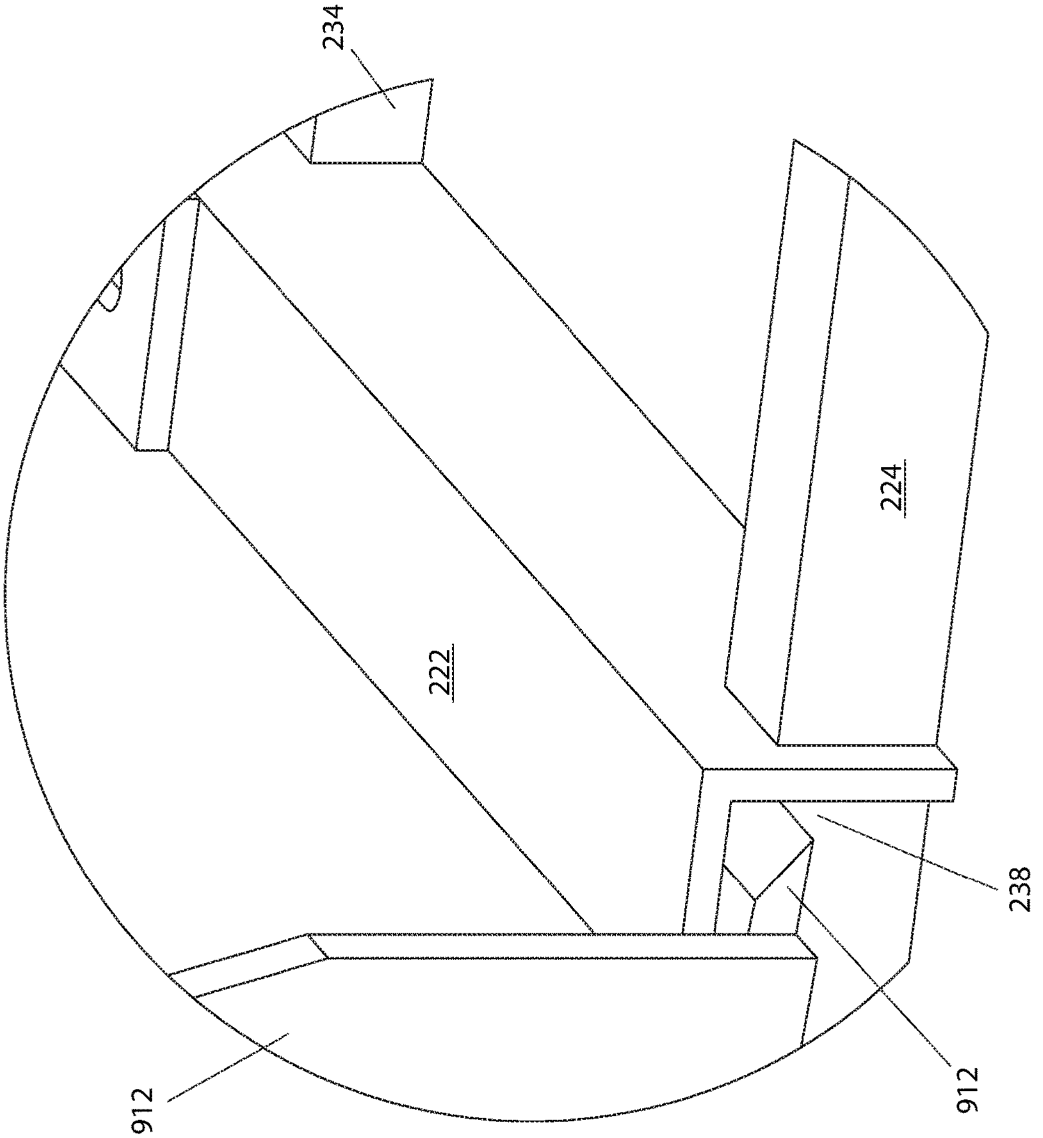
FIG. 5 is a detail view of an adjustable fork bracket, according to an embodiment of the present invention, illustrating the placement of the front edge of the bucket in the right channel.
Figure 6:
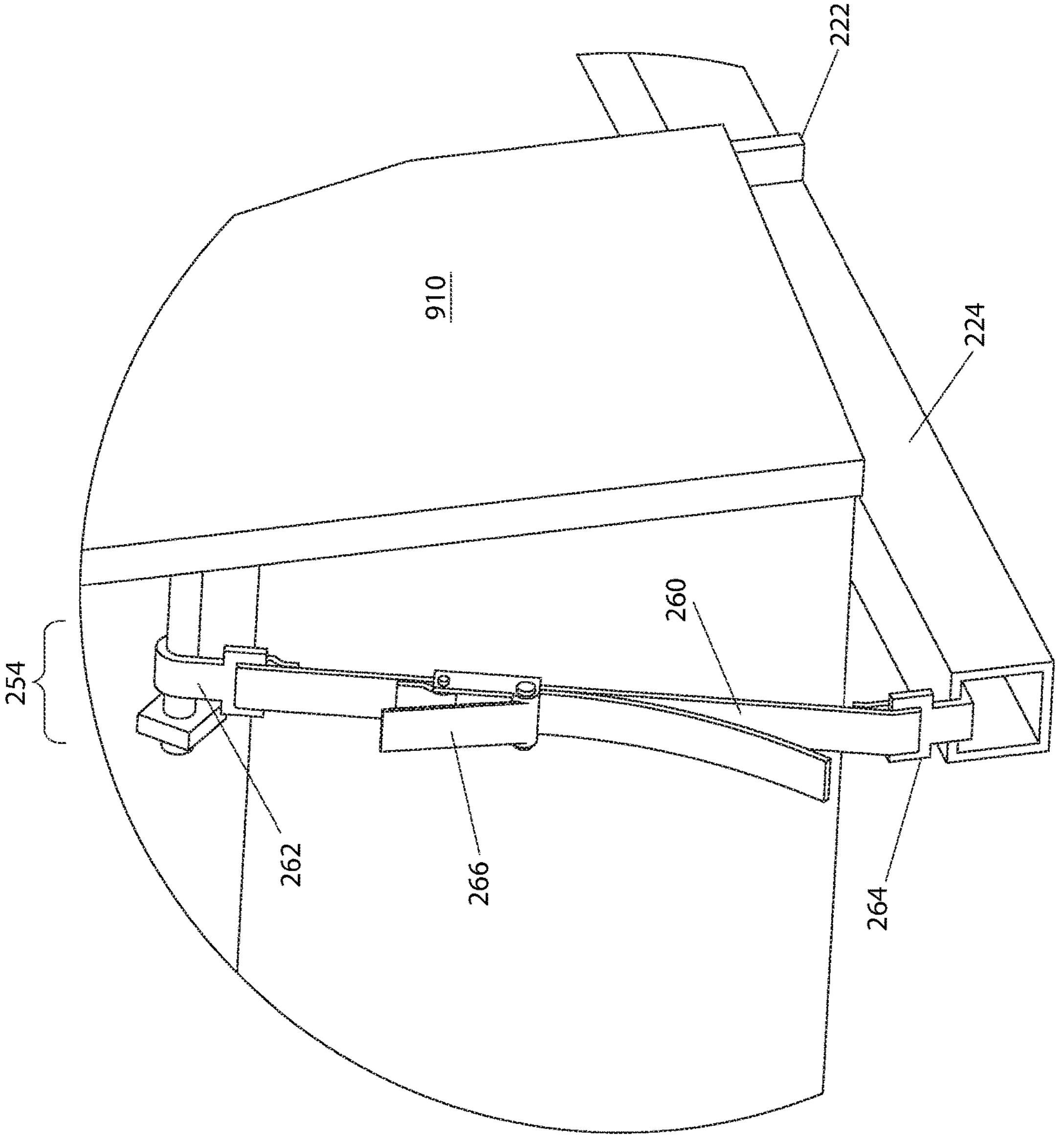
FIG. 6 is a detail view of an adjustable fork bracket, according to an embodiment of the present invention, illustrating an individual ratchet strap placed on the back of the bucket.

100 adjustable fork bracket
200 left fork bracket
202 left lateral arm
204 left primary tine
206 left tine tip
208 left strap coupler
210 left hook aperture
214 left secondary tine
216 separation adjuster
218 left channel
220 right fork bracket
222 right lateral arm
224 right primary tine
226 right tine tip
228 right strap coupler
230 right hook aperture
234 right secondary tine
236 separation lockdown
238 right channel
242 slot
250 left rachet strap
252 right ratchet strap
254 individual ratchet strap
260 strap
262 top hook
264 bottom hook
266 length adjuster
290 primary tine separation distance
910 bucket
912 front edge

DESCRIPTION OF THE INVENTION

The present invention is directed to an adjustable fork bracket (herein described as the "invention") 100. The invention 100 may comprise a left fork bracket 200, a right fork bracket 220, a left rachet strap 250, and a right ratchet strap 252. The invention 100 may be an accessory for coupling a fork to a front edge 912 of a bucket 910 of construction equipment. Tines of the fork may enable the construction equipment to lift materials using the bucket 910. As a non-limiting example, the construction equipment may be a front end loader and the materials may be a pallet. The left fork bracket 200 may comprise a left primary tine 204 on the left side of the bucket 910 and the right fork bracket 220 may comprise a right primary tine 224 on the right side of the bucket 910. The left rachet strap 250 and the right ratchet strap 252 may pass behind the bucket 910 to retain the invention 100 in place. A primary tine separation distance 290 between the left primary tine 204 and the right primary tine 224 may be adjustable.

The left fork bracket 200 may couple to the left side of the bucket 910. The left fork bracket 200 may comprise a left lateral arm 202 that may be an L-shaped armature. The left lateral arm 202 may be oriented laterally across the front of the bucket 910. A vertically oriented leg of the left lateral arm 202 may be located at the front of the left lateral arm 202 and a horizontally oriented leg of the left lateral arm 202 may be located at the top of the left lateral arm 202. The vertically oriented leg of the left lateral arm 202 may couple to the horizontally oriented leg of the left lateral arm 202 at the top front of the left lateral arm 202.

The left fork bracket 200 may comprise the left primary tine 204. The left primary tine 204 may pass through and may be coupled to the bottom left side of the vertically oriented leg of the left lateral arm 202. The left primary tine 204 may be oriented front-to-rear. More than one-half (>½) of the left primary tine 204 may extend forward from the left lateral arm 202 and less than one-half (<½) of the left primary tine 204 may extend rearward from the left lateral arm 202.

The rear of the left primary tine 204 may comprise a left strap coupler 208 for coupling the left rachet strap 250 to the rear of the left primary tine 204. As a non-limiting example, the left strap coupler 208 may be a left hook aperture 210.

In some embodiments, the left primary tine 204 may comprise a left tine tip 206 on the forward end of the left primary tine 204. The left tine tip 206 may be tapered to guide the left primary tine 204 under the materials.

In some embodiments, the left fork bracket 200 may comprise a left secondary tine 214. The left secondary tine 214 may be oriented to be parallel to the left primary tine 204 and may be located on the bottom right half of the left lateral arm 202. The left secondary tine 214 may be smaller than the left primary tine 204.

The left fork bracket 200 may comprise a left channel 218 between the horizontally oriented leg of the left lateral arm 202 and the left primary tine 204. The front edge 912 of the bucket 910 may be inserted into the left channel 218 such that the bucket 910 may lift the left fork bracket 200. Forward motion of the bucket 910 into the left channel 218 may be limited by the vertically oriented leg of the left lateral arm 202.

The left fork bracket 200 may comprise a separation adjuster 216. The separation adjuster 216 may be a laterally oriented slotted armature that is coupled to the top right of the left lateral arm 202 and extends towards the right fork bracket 220. The separation adjuster 216 may be operable to establish the primary tine separation distance 290 as measured between the left primary tine 204 and the right primary tine 224 when fixed to a right lateral arm 222.

The right fork bracket 220 may couple to the right side of the bucket 910. The right fork bracket 220 may comprise the right lateral arm 222 that may be an L-shaped armature. The right lateral arm 222 may be oriented laterally across the front of the bucket 910. A vertically oriented leg of the right lateral arm 222 may be located at the front of the right lateral arm 222 and a horizontally oriented leg of the right lateral arm 222 may be located at the top of the right lateral arm 222. The vertically oriented leg of the right lateral arm 222 may couple to the horizontally oriented leg of the right lateral arm 222 at the top front of the right lateral arm 222.

The right fork bracket 220 may comprise the right primary tine 224. The right primary tine 224 may pass through and may be coupled to the bottom right side of the vertically oriented leg of the right lateral arm 222. The right primary tine 224 may be oriented front-to-rear. More than one-half (>½) of the right primary tine 224 may extend forward from the right lateral arm 222 and less than one-half (<½) of the right primary tine 224 may extend rearward from the right lateral arm 222.

The rear of the right primary tine 224 may comprise a right strap coupler 228 for coupling the right ratchet strap 252 to the rear of the right primary tine 224. As a non-limiting example, the right strap coupler 228 may be a right hook aperture 230.

In some embodiments, the right primary tine 224 may comprise a right tine tip 226 on the forward end of the right primary tine 224. The right tine tip 226 may be tapered to guide the right primary tine 224 under the materials.

In some embodiments, the right fork bracket 220 may comprise a right secondary tine 234. The right secondary tine 234 may be oriented to be parallel to the right primary tine 224 and may be located on the bottom left half of the right lateral arm 222. The right secondary tine 234 may be smaller than the right primary tine 224.

The right fork bracket 220 may comprise a right channel 238 between the horizontally oriented leg of the right lateral arm 222 and the right primary tine 224. The front edge 912 of the bucket 910 may be inserted into the right channel 238 such that the bucket 910 may lift the right fork bracket 220. Forward motion of the bucket 910 into the right channel 238 may be limited by the vertically oriented leg of the right lateral arm 222.

The right fork bracket 220 may comprise a separation lockdown 236. The separation lockdown 236 may be located on the top left of the right lateral arm 222. The separation lockdown 236 may engage a slot 242 on the separation adjuster 216 to prevent movement of the separation adjuster 216. As a non-limiting example, the separation lockdown 236 may comprise separation lockdown hardware such as bolts, nuts, threaded apertures, flat washers, lock washers, or any combination thereof that may be tightened against the separation adjuster 216 top prevent movement of the separation adjuster 216 and may be loosened to permit movement of the separation adjuster 216. The primary tine separation distance 290 may be widened or narrowed while the separation lockdown 236 is loosened and the primary tine separation distance 290 may be maintained while the separation lockdown 236 is tightened.

Those of ordinary skill in the art will recognize that the positions, orientations, and directions of movement of the separation adjuster 216, the separation lockdown 236, the left fork bracket 200, and the right fork bracket 220 may be reversed end-for-end and that such reversals will fall within the spirit and scope of the present invention as defined in the claims.

The left rachet strap 250 and the right ratchet strap 252 may retain the rear of the invention 100 to the bucket 910 such that the invention 100 is prevented from tipping. The left rachet strap 250 may retain the left side of the left fork bracket 200 and the right ratchet strap 252 may retain the right side of the right fork bracket 220.

An individual ratchet strap 254 selected from the left rachet strap 250 and the right ratchet strap 252 may comprise a strap 260, a top hook 262, a bottom hook 264, and a length adjuster 266. The strap 260 may be coupled at one end to the top hook 262 and at the opposite end to the bottom hook 264. The top hook 262 may be coupled to the top rear of the bucket 910. The bottom hook 264 of the left rachet strap 250 may be coupled to the left strap coupler 208 on the left primary tine 204 and the bottom hook 264 of the right ratchet strap 252 may be coupled to the right strap coupler 228 on the right primary tine 224. In some embodiments, the strap 260 may be a nylon cargo strap.

The length adjuster 266 may be operable to enable varying the length of the strap 260 such that the individual ratchet strap 254 may be tightened during installation and loosened during removal.

In use, the lateral width of the invention 100 may be adjusted to match the width of the bucket 910 by loosening the separation lockdown 236, pushing the left fork bracket 200 and the right fork bracket 220 closer together or farther apart, and tightening the separation lockdown 236. The bucket 910 may be lowered onto the rear of the invention 100 then pushed forward to catch the front edge 912 of the bucket 910 in the left channel 218 and the right channel 238. The bottom hook 264 of the left rachet strap 250 may be coupled to the left strap coupler 208, the top hook 262 of the left rachet strap 250 may be coupled to the top left rear of the bucket 910, and the left rachet strap 250 may be tightened using the length adjuster 266 on the left rachet strap 250 to pull the left rachet strap 250 tight behind the bucket 910. Likewise, the bottom hook 264 of the right ratchet strap 252 may be coupled to the right strap coupler 228, the top hook 262 of the right ratchet strap 252 may be coupled to the top right rear of the bucket 910, and the right ratchet strap 252 may be tightened using the length adjuster 266 on the right ratchet strap 252 to pull the right ratchet strap 252 tight behind the bucket 910. A user may then operate the construction equipment to maneuver the left primary tine 204 and the right primary tine 224 under the materials and may lift the bucket 910 to lift the materials. The user may drive the construction equipment to a different location, may lower the bucket 910 to place the materials on the ground, and may slide the left primary tine 204 and the right primary tine 224 out from under the materials.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An adjustable fork bracket, comprising:

a left fork bracket having a left lateral arm and a left primary tine, the left fork bracket is adapted to couple to a left side of a bucket and the left primary tine is adapted to be disposed on the left side of the bucket;

a right fork bracket having a right lateral arm, a right primary tine, and a separation lockdown, the right fork bracket is adapted to couple to a right side of the bucket and the right primary tine is adapted to be disposed on the right side of the bucket;

a left rachet strap having a strap, a top hook, a bottom hook, and a length adjuster, the left rachet strap is adapted to passing behind the bucket, the left rachet strap prevents the adjustable fork bracket from tipping; and a right ratchet strap having a strap, a top hook, a bottom hook, and a length adjuster; and, wherein the left primary tine passes through and is coupled to a bottom left side of the vertically oriented leg of the left lateral arm.

2. The adjustable fork bracket, according to claim 1, wherein the left lateral arm is adapted to be oriented laterally across the front of the bucket.

3. The adjustable fork bracket, according to claim 1, wherein the left lateral arm is an L-shaped armature.

4. The adjustable fork bracket, according to claim 1, wherein the vertically oriented leg of the left lateral arm couples to the horizontally oriented leg of the left lateral arm at a top front of the left lateral arm.

5. The adjustable fork bracket, according to claim 1, wherein the right fork bracket includes a right channel between a horizontally oriented leg of the right lateral arm and the right primary tine.

6. The adjustable fork bracket, according to claim 1, wherein the left fork bracket includes the left primary tine on the left side of the bucket and the right fork bracket includes the right primary tine on the right side of the bucket.

7. The adjustable fork bracket, according to claim 1, wherein a rear of the left primary tine includes a left strap coupler for coupling the left rachet strap to the rear of the left primary tine.

8. The adjustable fork bracket, according to claim 7, wherein the left strap coupler is a left hook aperture.

9. The adjustable fork bracket, according to claim 1, wherein the left primary tine includes a left tine tip on the forward end of the left primary tine that is tapered to guide the left primary tine.

10. The adjustable fork bracket, according to claim 1, wherein the right lateral arm is adapted to be oriented laterally across the front of the bucket.

11. The adjustable fork bracket, according to claim 1, wherein the right lateral arm is an L-shaped armature includes a right tine tip on a forward end of the right primary tine.

12. The adjustable fork bracket, according to claim 11, wherein the right tine tip is tapered to guide the right primary tine.

13. The adjustable fork bracket, according to claim 1, wherein the separation lockdown is located on a top left of the right lateral arm and engage a slot on the separation adjuster to prevent movement of the separation adjuster.

14. The adjustable fork bracket, according to claim 1, wherein the separation lockdown includes a plurality of separation lockdown hardware selected from the group consisting of a plurality of bolts, a plurality of nuts, a plurality of threaded apertures, a plurality of flat washers, a plurality of lock washers, or any combination thereof that is tightened against the separation adjuster to prevent movement of the separation adjuster.

15. The adjustable fork bracket, according to claim 1, wherein the strap of the left rachet strap is a nylon cargo strap.

16. The adjustable fork bracket, according to claim 1, wherein the strap of the right rachet strap is a nylon cargo strap.

* * * * *